Dec. 8, 1959  E. F. MACKS  2,916,642
FLUID DYNAMIC DEVICE

Filed April 16, 1956  2 Sheets-Sheet 1

INVENTOR.
ELMER FRED MACKS
BY Pyle and Fisher
ATTORNEYS

United States Patent Office 2,916,642
Patented Dec. 8, 1959

2,916,642
FLUID DYNAMIC DEVICE

Elmer Fred Macks, Vermilion, Ohio, assignor, by direct and mesne assignments, to Air-Glide Inc., Cleveland, Ohio, a corporation Application April 16, 1956, Serial No. 578,536

12 Claims. (Cl. 310—90)

This invention pertains to dynamoelectric machines, and more particularly to an improved dynamoelectric machine of the type having a rotor which is supported on a load carrying fluid dynamic film formed between a rotor and a stator.

In copending application for patent Serial No. 558,676, filed January 12, 1956, now abandoned in favor of continuation-in-part application, Serial Number 714,454, filed January 28, 1958, under the title "Fluid Supported Rotor," there has been disclosed a dynamoelectric machine of the type wherein a fluid dynamic film is formed to support the rotor. In the machine there disclosed bearings, bell housings, and other parts of prior known machines are eliminated. Alignment, vibration, and other problems are also substantially reduced. In that application the broad principles of a dynamoelectric machine having a fluid supported rotor have been disclosed, but, generally speaking, those broad principles are directed to a machine which is primarily applicable for torque loads, particularly where the film is pneumodynamic. It has been discovered through certain modifications and improvements that substantial loads or forces acting transverse to the axis of the rotor can be supported in a machine of this type.

Accordingly, one of the principal objects of this invention is to provide a mechanism wherein forces acting transverse to the axis of rotor rotation can be carried on a fluid supporting film, even when a gas is the ambient fluid.

A further object of this invention is to provide a device wherein loads transverse to the axis of rotation are distributed substantially uniformly along the entire longitudinal extent of a load carrying fluid film producing region.

One mechanism for accomplishing the foregoing objective is a device which is counterbalanced to provide rotating elements which together have a center of gravity which is substantially in a plane which perpendicularly bisects the axis of the load carrying fluid film producing region.

It is, therefore, a further object of this invention to provide a device wherein counterbalancing means are employed to provide a center of gravity substantially in the longitudinal center of the load carrying fluid film producing region.

A further principal object of this invention is to provide a fluid dynamic motor which is quiet.

Still another principal object of this invention is to provide a motor wherein the rotor may be wholly supported upon a film of gas to provide a clean, low cost, light weight, highly efficient device which may operate under extreme temperature conditions.

Another object of this invention is to provide a mechanism wherein the inner element is the fixed or stator element and the outer element is the rotating or rotor element to permit an object to be driven to have forces transmitted to it through coaction with driving means carried about the periphery of the outer element.

Yet another object of this invention is to provide a mechanism wherein driving forces are transmitted from a central region on the rotor to an object to be driven and wherein the rotor rotates within the stator.

Still another object of this invention is to provide a hermetically sealed fluid dynamic film supported rotor and stator wherein driving forces are transmitted from within the hermetically sealed member to an external member.

A further object of this invention is to provide a hermetically sealed motor generator unit whereby alternating current may be converted to direct current, or vice versa, by a device which is totally sealed with the film producing fluid contained within the sealed housing.

An additional object of this invention is to provide a motor generator set in which the rotor of both the motor and of the generator is carried on a fluid film and in which the rotors are operably connected by flexible coupling means.

An additional object of this invention is to provide a combination turbine generator device wherein the rotating elements of both the turbine and the generator are carried on fluid dynamic films.

Still another object of this invention is to provide a combination having a fixed armature and a rotating field wherein both fluid dynamic thrust and journal films are provided.

Another and more specialized object of this invention is to provide a rotor of tubular construction to provide a motor of reduced weight and cost of manufacture.

Other objects and a fuller understanding of the invention may be had by referring to the following description and claims, taken in conjunction with the accompanying drawings, in which:

Figure 5:
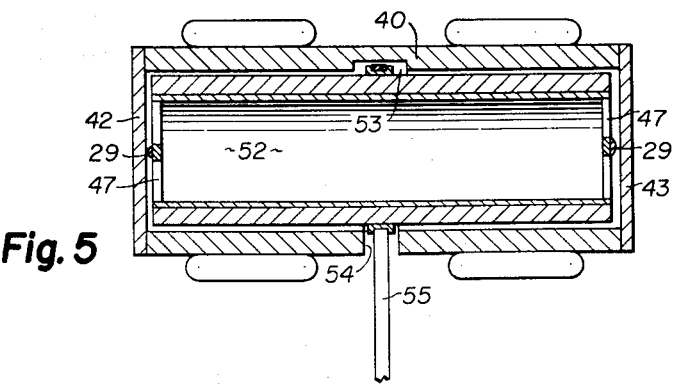
Figure 6:
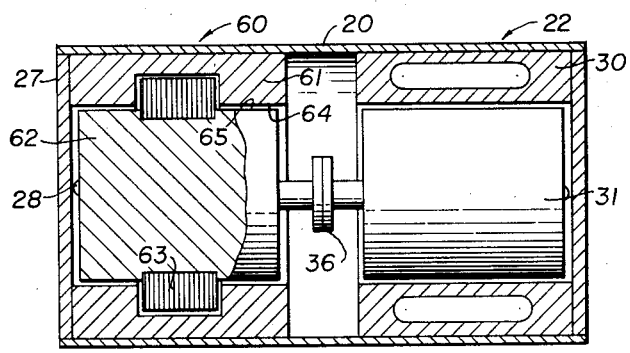
Figure 7:
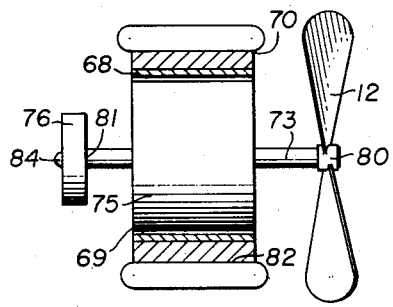
Figure 8:
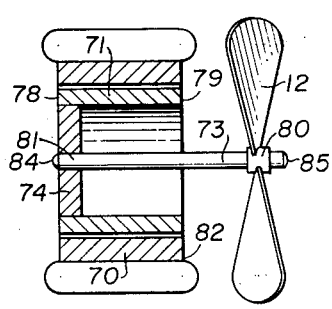
Figure 9:
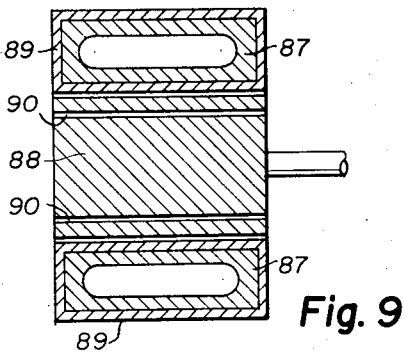

Figure 5 discloses a motor wherein apertures are provided in the stator to permit a power transmission device, such as a belt, to engage the rotor at its longitudinal midsection;

Figure 6 is a diagrammatic sectional view of a turbine and a generator formed in a compact unit;

Figure 7 is a diagrammatic view of a fan having a rotor with a counter balance;

Figure 8 is a sectional view of a motor having a counterbalanced rotor of tubular construction; and, Figure 9 is a sectional view of a dynamoelectric device having a hermetically sealed stator.

Figure 1:
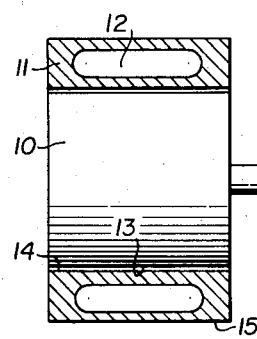
Figure 1 is a schematic sectional view of a fluid dynamic device having a fixed armature and a moving field.

Referring to the drawings, and to Figure 1 in particular, a stator is shown general at 10. In Figure 1 the stator is a fixed armature. A rotor element is shown at 11, which in Figure 1 is the field element. A winding is provided at 12 in element 11 of Figure 1. The stator and rotor elements 10, 11 have complemental surfaces 13, 14 which are in a close running fit. The surfaces may be annular or transcribe segments of an annulus. In the preferred form of the device the surfaces are generally cylindrically contoured and form a load carrying fluid dynamic film producing region therebetween. The radial dimension of the fluid film producing region between the surfaces 13, 14 is from 0.00005 to 0.003 inch per inch of diameter. When the film is gas the radial dimensions are less than when the film is a liquid. The exact clearance values also vary with operating conditions. The surfaces preferably have a taper which is not in excess of about 0.0003 inch per inch of diameter per inch of longitudinal length.

In the embodiment of Figure 1 a fan, gear, belt, or other force transmitting device may be fixed to periphery 15 of the rotor 11. Through this construction forces may be symmetrically disposed about a plane which perpendicularly bisects the axis of the fluid film producing region defined by the surfaces 13, 14.

In this and the succeeding embodiments the complemental surfaces 13, 14 are shown as completely annular. One of the surfaces may be interrupted and formed in segments, however.

Figure 2:
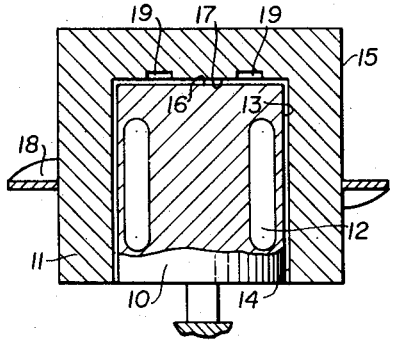
Figure 2 shows a fan made in accordance with the present invention wherein a fixed armature and a rotating field are employed and wherein the rotating elements produce both fluid dynamic thrust and journal bearing films.

In Figure 2 the stator 10, which is the field, has its cylindrically contoured surface 13 disposed about a substantially vertical axis. The stator 10 has a flat top surface 16. The rotor 11 has an inner complemental surface 17 which coacts with the surface 16 to provide a thrust bearing fluid film producing region. The surface 16 has recesses 19 formed therein to produce such a film. The region between the complemental surfaces 13, 14 serves as a journal bearing fluid film region. A fan blade 18 is connected to the periphery 15 of the rotor 11. A gear or belt may replace the fan blade.

Figure 3:
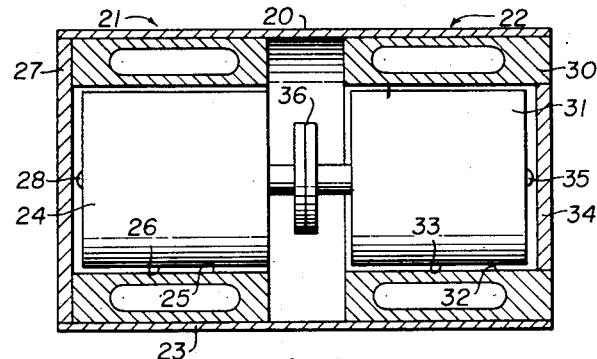
Figure 3 is a schematic sectional view of a hermetically sealed motor generator device.

In the embodiment of Figure 3, a frame structure which may be in the form of a hermetically sealed housing 20 is provided. A motor, shown generally at 21, is provided at one end of the housing 20, and a generator, shown generally at 22, is provided at the other end.

The motor 21 has a fixed stator 23 and a rotating element 24 which in this instance is the armature. The stator 23 and the rotor 24 have complemental fluid dynamic film producing surfaces 25, 26.

An end plate 27 is connected to one end of the housing 20. An end thrust bearing 28 is disposed between the rotor 24 and the end plate 27 to limit axial movement of the rotor to the left, as seen in Figure 3. The thrust bearing 28 may take the form of a pivot, rolling contact, fluid dynamic or other thrust bearing.

The generator 22 has a fixed stator 30. The stator 30, like the stator 23, includes the winding or field. A rotor 31 is disposed within the stator 30. The stator 30 and the rotor 31 have complemental fluid film producing surfaces 32, 33.

An end plate 34 is provided which may be a removable plate corresponding to end plate 27 or an integral part of the housing 20. A thrust bearing 35 is interposed between the end plate 34 and the rotor 31. The thrust bearing 35 corresponds in form and function to the thrust bearing 28.

A flexible coupling 36 is interposed between the rotors 24, 31. The coupling 36 may, of course, be rigid if the elements are properly aligned. A flexible coupling is preferred to aid in the provision of free, vibrationless, non-binding rotation of the two rotors.

Figure 4:
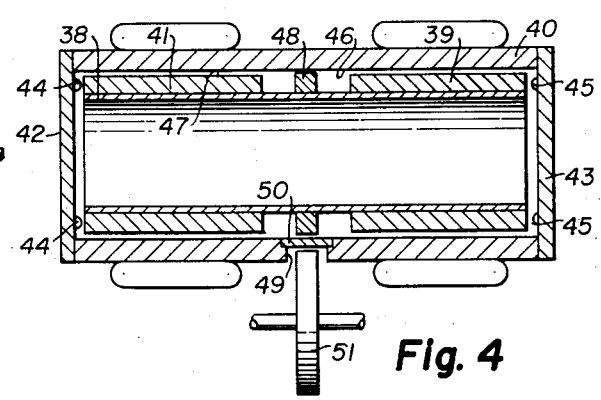
Figure 4 is a sectional view of a hermetically sealed fluid dynamic motor wherein a magnetic wheel is sealed within the hermetically sealed housing to provide a coupling to drive an external wheel.

In the embodiment of Figure 4 an elongated stator 40 is provided. In this construction the stator may form a portion of the hermetically sealed housing. Armature segments 39, 41 are carried on a sleeve 38 to form a light weight, tubular rotor which is carried within the stator 40. End plates 42, 43 are provided to seal the device. Thrust bearings 44, 45 which correspond in function to thrust bearings 28, 35 are provided between the armature segments 39, 41 and the end plates 42, 43 respectively. The bearings 44, 45 coact with the ends of the sleeve 38 and/or one of the ends of each of the armature segments 39, 41.

Alternately, the thrust bearing may be carried as in the disclosure of Figure 5. There, thrust bearings 29 are carried on struts or spiders 47.

A magnetic wheel is suitably fixed to the sleeve 38 substantially at its midpoint. A recess 49 is formed in the stator 40. A thin plate 50 of suitable non-magnetic material, such as a plastic or aluminum sheet, is fixed to the stator. The thin plate 50 closes an opening 49 in the stator. The thin plate 50 may be in close spaced relationship with the magnetic wheel and may in fact have an inner surface which forms a part of the stator inner surface 46. The magnetic wheel may have an outer surface which together with the stator inner surface 46 will produce a fluid dynamic film.

An external wheel 51 is provided and located to project into the opening 49. The wheel 51 is made of material which is attracted to a magnet. Upon rotation of the rotor segments 40, 41, the sleeve 38 and the magnetic wheel 48 are driven in rotative movement. The magnetic wheel 48 will in turn drive the external wheel 51. Thus, a hermetically sealed motor is provided.

Through the constructions of Figures 4 and 5 several outstanding features of this invention are achieved. First, a dirt free, hermetically sealed device is provided in which the lubricating fluid can be sealed. Second, a light weight motor of reduced cost of manufacture in which shafts, bell housings, bearings and portions of the armature have been eliminated has been disclosed. And, third, a motor is shown in which the forces transverse to the axis of rotation are uniformly distributed along the longitudinal extent of the fluid film. Furthermore, in all of the devices the sealed-in fluid may be a gas.

Further, in the embodiments shown in Figures 3 and 4 an electric motor which is completely free from collections of dirt and other impurities which normally tend to limit the life of electric motors is provided. Such a motor is substantially vibrationless and quiet. It may function in all types of adverse conditions such as under water or at extreme altitudes. Further, if air or other gas is the hermetically sealed film producing fluid, high efficiency is achieved and temperature ranges are no limitation to the acceptable operating conditions of the device.

In the device of Figure 5 apertures 54 are formed in the stator 40. A belt 55 to be driven by rotor 52 is inserted through the apertures 54. The rotor 52 is of cylindrical configuration and the stator has a relief 53 formed internally to provide room for the belt 55. A gear or other force transmitting member may be used rather than the belt 55. Additionally, the recessed rotor of Figure 4 may be employed in the device of Figure 5, and, conversely, the recessed stator of Figure 5 may be employed in the structure of Figure 4.

In the device of Figure 6 a turbine is shown generally at 60 at one end of the device. A generator 22 which is identical to the generator of Figure 3 is driven by the turbine 60. The turbine has a stationary member 61 and a rotating member 62. The rotating member 62 has a plurality of blades 63 which are driven by one of the known methods employed in turbines.

The stationary member 61 and the rotating member 62 have complemental surfaces 64, 65. These surfaces are fluid film producing surfaces which are in a close running fit. In a gas turbine with a gas fluid dynamic film supporting the rotatable member, the tolerances are in the nature of those discussed with respect to Figure 1.

In Figure 7 a counterbalanced machine is shown as a fan for illustrative purposes. Shaft 73 is extended and a counter-weight 76 is mounted thereon to one end of rotor 75. Thus, in this embodiment, fan 72, the shaft 73, the rotor 75, and the counter-weight 76 form a rotating assembly which has a center of gravity which is substantially at the longitudinal midpoint of the load carrying fluid film producing region.

In Figure 8 a novel fan employing a light weight, hollow or tubular rotor 71 is disclosed. The rotor 71 is the armature. In this and the previous embodiment, the field 70 is the stator. The fan blade 72 is fixed to one end 80 of shaft 73. The shaft 73 in turn is fixed at the other end 81 to a counterbalancing mounting member 74. The counterbalancing mounting member 74 is in turn fixed to one end 78 of the rotor 71. With the shaft 73 projecting past the other end 79 of the rotor 71, the fan is thus located at the remote end 80 of the shaft 73. A stabilizing spider may be employed, of course, at the other end 79 of the rotor to reinforce the shaft support. Through this construction the rotor 71, the blade 72, and the shaft 73 along with the counterbalancing mounting member 74 form a rotating assembly which has a center of gravity which lies substantially in a plane which perpendicularly bisects the axis of the load carrying fluid film producing region between the rotor and stator.

In Figure 7 a non-magnetic sleeve 68 is provided on the rotor 70. The sleeve defines rotor complemental inner surface 69.

Through the constructions of Figures 7 and 8 a fan has been disclosed which rotates with its forces transverse to the axis of rotation distributed substantially uniformly across the entire load carrying fluid film producing region. By this construction an extremely light weight motor which outperforms prior known motors in many respects is provided. The motor is substantially vibration-free because it is believed that the rotating assembly tends to rotate about its center of gravity, and additionally, it is believed, because the load carrying fluid dynamic film absorbs vibrating forces. Further, bearings which in prior known motors have been the cause of much vibration, are eliminated. The motor is light weight and operates at high efficiency.

In Figure 8 a pair of stops 84, 85 are provided to limit the axial movement of the rotor 71. In operation, the magnetic field will hold the rotor in position if the axis of rotation is substantially horizontal. Therefore, in the embodiment of Figure 7, the stop 85 is eliminated. The stop 84 will suffice to prevent the rotor from coming out of the stator when the fan is turned off. The fan will tend to push the rotor toward the stop when the field is de-energized.

In Figure 9 a further novel embodiment of the invention is shown. Here the stator, indicated at 87, is hermetically sealed within a covering 89. The rotor, indicated at 88, has passages 90 therethrough. This construction permits the motor to be immersed as for driving a pump to propel a caustic or acid solution. The passages 90 permit the fluid to flow through the rotor. In some applications it may also be desirable to seal the rotor in a protective sheath corresponding to the covering 89.

There has thus been described a series of mechanisms wherein a fluid dynamic film supported rotor is employed in a dynamoelectic device and wherein the force transmission may be in a manner which causes substantial forces to be exacted on the rotor transverse to the axis of rotation.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A dynamoelectric device comprising a stator element and a rotor element, relatively rotatable about a horizontal axis, the elements having complemental cylindrically contoured surfaces, the surfaces being substantially concentric to form a load carrying fluid dynamic film producing region therebetween, said rotor being totally supported radially by the film generated in said region when the elements are relatively rotating and means carried by said rotor for operable connection to an object to be driven, said means being arranged to distribute such driven radial load on either side of a plane which essentially perpendicularly bisects the axis of said complemental surfaces.

2. A dynamoelectric device comprising a stator element and a rotor element relatively rotatable about a horizontal axis, the elements having complemental surfaces, the surfaces being substantially concentric to form a load carrying fluid dynamic film producing region therebetween, said rotor being totally supported radially by the film generated in said region when the elements are relatively rotating and means carried by said rotor for operable connection to an object to be driven, said means being arranged to distribute such driven radial load symmetrically about a plane which essentially perpendicularly bisects the axis of said complemental surfaces.

3. A dynamoelectric device comprising a stator element and a rotor element relatively rotatable about a horizontal axis, the elements having complemental surfaces, the surfaces being substantially concentric to form a load carrying fluid dynamic film producing region therebetween, said rotor being totally supported radially by the film generated in said region when the elements are relatively rotating means carried by said rotor for operable connection to an object to be driven, said means being arranged to distribute such driven radial load on either side of a plane which perpendicularly bisects the axis of said complemental surfaces, and axial stop means carried by said elements to limit the axial movement of the rotor.

4. A dynamoelectric device comprising a stator element and a rotor element relatively rotatable about a horizontal axis, the elements having complemental surfaces, the surfaces being substantially concentric to form a load carrying fluid dynamic film producing region therebetween, said rotor being totally supported radially by the film generated in said region when the elements are relatively rotating said region having a radial dimension of from 0.00005 inch to 0.003 inch per inch of diameter, and means carried by said rotor for operable connection to an object to be driven, said means being arranged to distribute such driven radial load on either side of a plane which perpendicularly bisects the axis of said complemental surfaces.

5. A dynamoelectric device comprising rotor and stator elements relatively rotatable about a horizontal axis, said elements having smooth complemental surfaces, the surfaces being substantially concentric to produce a load supporting fluid dynamic film upon relative rotation, said rotor being totally supported radially by the film generated in said region when the elements are relatively rotating and means to balance the rotor about a plane transverse to the axis of the elements.

6. A dynamoelectric device comprising a stator field element and a rotor armature element relatively rotatable about a horizontal axis, the elements having complemental surfaces, the surfaces being substantially concentric to produce a load carrying fluid dynamic film upon relative rotation of the elements, said rotor being tubular and totally supported radially on said load carrying fluid film when the device is in operation.

7. A dynamoelectric device comprising stator and rotor elements relatively rotatable about a horizontal axis, said elements having complemental surfaces defining a load carrying fluid film producing region therebetween, said rotor being totally supported radially by a load carrying fluid film generated in said region when the elements rotate relatively, an hermetically sealed housing containing said elements, and a quantity of fluid sealed in said housing, said quantity being sufficient to provide such load carrying film when the device is in operation.

8. A dynamoelectric device comprising stator and rotor elements relatively rotatable about a horizontal axis, said elements having complemental surfaces defining a load carrying fluid film producing region therebetween, said rotor being totally supported radially by a load carrying fluid film generated in said region when the elements rotate relatively, an hermetically sealed housing containing said elements, and a quantity of gas sealed in said housing, said quantity being sufficient to provide such load carrying film when the device is in operation.

9. A dynamoelectric device comprising stator and rotor elements relatively rotatable about a horizontal axis, said elements having complemental surfaces defining a load carrying fluid film producing region therebetween, said rotor being totally supported radially by a load carrying fluid film generated in said region when the elements rotate relatively, an hermetically sealed housing containing said elements, a quantity of fluid sealed in said housing, said quantity being sufficient to provide such load carrying film when the device is in operation, a drive member carried in said housing in operable connection with said rotor, and an external member drivable thereby.

10. A dynamoelectric device comprising relatively rotatable rotor and stator elements, the elements having complemental substantially coaxial surfaces defining a load carrying fluid film producing region therebetween, one of said elements including means to induce a magnetic field, said region being disposed in said magnetic field and having a longitudinal dimension substantially equal to the longitudinal dimension of the rotor, and drive means connected to said rotor element for transmission of rotative force, said drive means connection being at substantially the longitudinal mid-point of said rotor.

11. The device of claim 10 wherein said fluid is a gas.

12. The device of claim 10 wherein the rotor is symmetrically disposed about a first axis and the rotor rotates about a second axis which includes the center of mass of the rotor, and wherein the first axis is distinct from the second axis.

References Cited in the file of this patent

UNITED STATES PATENTS

| | | |
|---|---|---|
| 473,367 | Short | Apr. 19, 1892 |
| 1,122,167 | Southgate | Dec. 22, 1914 |
| 1,847,006 | Kalischer | Feb. 23, 1932 |
| 2,167,641 | Dewan | Aug. 1, 1939 |
| 2,214,086 | Rataiczak | Sept. 10, 1940 |
| 2,243,555 | Faus | May 27, 1941 |
| 2,547,599 | Roters | Apr. 3, 1951 |

FOREIGN PATENTS

| | | |
|---|---|---|
| 485,225 | Great Britain | May 17, 1938 |
| 810,071 | France | Dec. 19, 1936 |
| 129,404 | Sweden | Sept. 12, 1950 |